US012228942B1

United States Patent
Malone et al.

(10) Patent No.: US 12,228,942 B1
(45) Date of Patent: Feb. 18, 2025

(54) SYSTEM, METHOD AND APPARATUS FOR REPORTING DATA FROM A TELEMATICS DEVICE BASED ON CHANGES IN HEADING DATA

(71) Applicant: ORBCOMM, INC., Rochelle Park, NJ (US)

(72) Inventors: Craig Malone, Lansdowne, VA (US); Dean Brickerd, Ashburn (VA)

(73) Assignee: ORBCOMM, Inc., New Rochelle Park, NJ (US)

( * ) Notice: Subject to any disclaimer, the term of this patent is extended or adjusted under 35 U.S.C. 154(b) by 134 days.

(21) Appl. No.: 17/357,889

(22) Filed: Jun. 24, 2021

Related U.S. Application Data

(60) Provisional application No. 63/043,356, filed on Jun. 24, 2020.

(51) Int. Cl.
| | | |
|---|---|---|
| G05D 1/00 | (2024.01) |
| G06Q 10/0832 | (2023.01) |
| G06Q 10/0833 | (2023.01) |
| G07C 5/00 | (2006.01) |

(52) U.S. Cl.
CPC .......... *G05D 1/0278* (2013.01); *G05D 1/027* (2013.01); *G06Q 10/0833* (2013.01); *G07C 5/008* (2013.01); *G06Q 10/0832* (2013.01)

(58) Field of Classification Search
CPC .. G05D 1/0278; G05D 1/027; G06Q 10/0833; G06Q 10/0832; G07C 5/008; H04W 4/029; H04W 4/021; G08G 1/205; G08G 1/207
See application file for complete search history.

(56) References Cited

U.S. PATENT DOCUMENTS

| | | | | |
|---|---|---|---|---|
| 2011/0202305 A1* | 8/2011 | Willis | .................... | G07C 5/085 |
| | | | | 702/141 |
| 2016/0247330 A1* | 8/2016 | Rork | ..................... | H04W 4/021 |
| 2020/0037115 A1* | 1/2020 | Ady | .................... | H04W 40/242 |

\* cited by examiner

*Primary Examiner* — Anne Marie Antonucci
*Assistant Examiner* — Jewel Ashley Kuntz

(57) ABSTRACT

The present invention relates to a system, method and apparatus for transmitting data reports at adjustable reporting rates based on detected rates of change in the heading of a tracked asset. According to a preferred embodiment, upon detection of a heading change, the device of the present invention may preferably power a location detection device (e.g., a GPS receiver or the like) to determine an accurate location. At the same time, the asset device may preferably monitor and store both the current heading and the rate of change of the heading. Based on the detected rate of change of the heading, the system may preferably select and update a report frequency based on a lookup table. Preferably, the lookup table may be based on a correlation between a given rate of heading change and predetermined temporal sample rates. According to a preferred embodiment, the higher the rate of change in heading may correspond to a higher temporal sample rate.

15 Claims, 3 Drawing Sheets

SYSTEM, METHOD AND APPARATUS FOR REPORTING DATA FROM A TELEMATICS DEVICE BASED ON CHANGES IN HEADING DATA

RELATED APPLICATIONS

The present application claims the benefit of U.S. Provisional Application No. 63/043,356 filed Jun. 24, 2020, which application is hereby incorporated herein by reference in its entirety.

BACKGROUND AND FIELD OF THE PRESENT INVENTION

Field of the Present Invention

The present invention relates to a system, method and apparatus for managing asset tracking communications. More particularly, the present invention relates to an algorithm for reporting data from a telematics device based on changes in heading data.

Background of the Invention

Commercial asset tracking devices are required to be small and unobtrusive. At the same time, most of these devices must run autonomously for extended periods of time using self-contained batteries. Typical implementations for transmitting device reports are based on temporal or event-based logic. The challenge with these approaches is these reporting events are not correlated with the physical route travelled. Additionally, systems have difficulty determining an exact route travelled (spatial information) unless they are capturing position data at a high sample rate (temporal data). These required high sample rates result in larger data and higher power usage over the wide area network utilized for connectivity.

In addition to requiring high sample rates and frequent reporting, standard reports during travel often do not strictly contain high priority information. For example, where an asset is travelling a direct route, monitoring systems can often track a vehicle using simple time and distance calculations which only require a few reports spaced over long intervals of time. In these types of situations, having the tracking device reporting every 10-15 seconds and relaying information which can be separately estimated is inefficient. Conversely, where a vehicle is travelling through a congested area or crossing important intersections, reporting every 10-15 second is inadequate.

Prior art solutions have attempted to incorporate motion and/or position sensors to assist in determining when a tracking device powers up and makes reports to monitoring stations. Such motion and/or position determination capability has conventionally been provided using a combination of positioning data (e.g. GPS) and on-board devices (e.g. accelerometers) to provide relative position, acceleration and/or orientation information.

However, these conventional techniques are still relatively costly when it comes to device power. In particular, using accelerometer data still results in inefficient levels of device reporting during times when the vehicle's path and location may be anticipated without frequent reports. For this reason, there is a significant need for an improved algorithm to provide timely reports without overly taxing the limited power of asset monitoring devices.

SUMMARY OF THE PRESENT INVENTION

To address the shortcomings of the prior art, the present invention provides an algorithm for managing communications and conserving power within a distributed monitoring network. The proposed method provides an improved algorithm for balancing the amount of data transmitted, power efficiency, and spatial resolution.

According to a first preferred embodiment, the present invention includes a system, method and apparatus for transmitting data reports at adjustable reporting rates which are based on detected rates of change of the heading of a tracked asset.

According to the first preferred embodiment, the present invention may preferably interpret heading data to determine the need to transmit data reports. According to a further preferred embodiment, upon detection of a heading change, the device of the present invention may preferably power a location detection device (e.g. a GPS receiver or the like) to determine an accurate location. At the same time, the asset device may preferably monitor and store both the current heading and the rate of change of the heading. Based on the detected rate of change of the heading, the system preferably may select and update a report frequency based on a lookup table. Preferably, the lookup table may be based on a correlation between the rate of heading change and the temporal sample rate.

According to a preferred embodiment, higher detected rates of change in headings may preferably correspond to higher temporal sample rates. Conversely, the present invention may preferably increase the time between reports and/or sampling when the accelerometer is not detecting high rates of change in angular forces and thus may minimize data usage and data processing during these times.

Other goals and advantages of the invention will be further appreciated and understood when considered in conjunction with the following description and accompanying drawings. While the following description may contain specific details describing particular embodiments of the invention, these details should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DETAILED DESCRIPTION OF THE PREFERRED EMBODIMENTS

Figure 1:
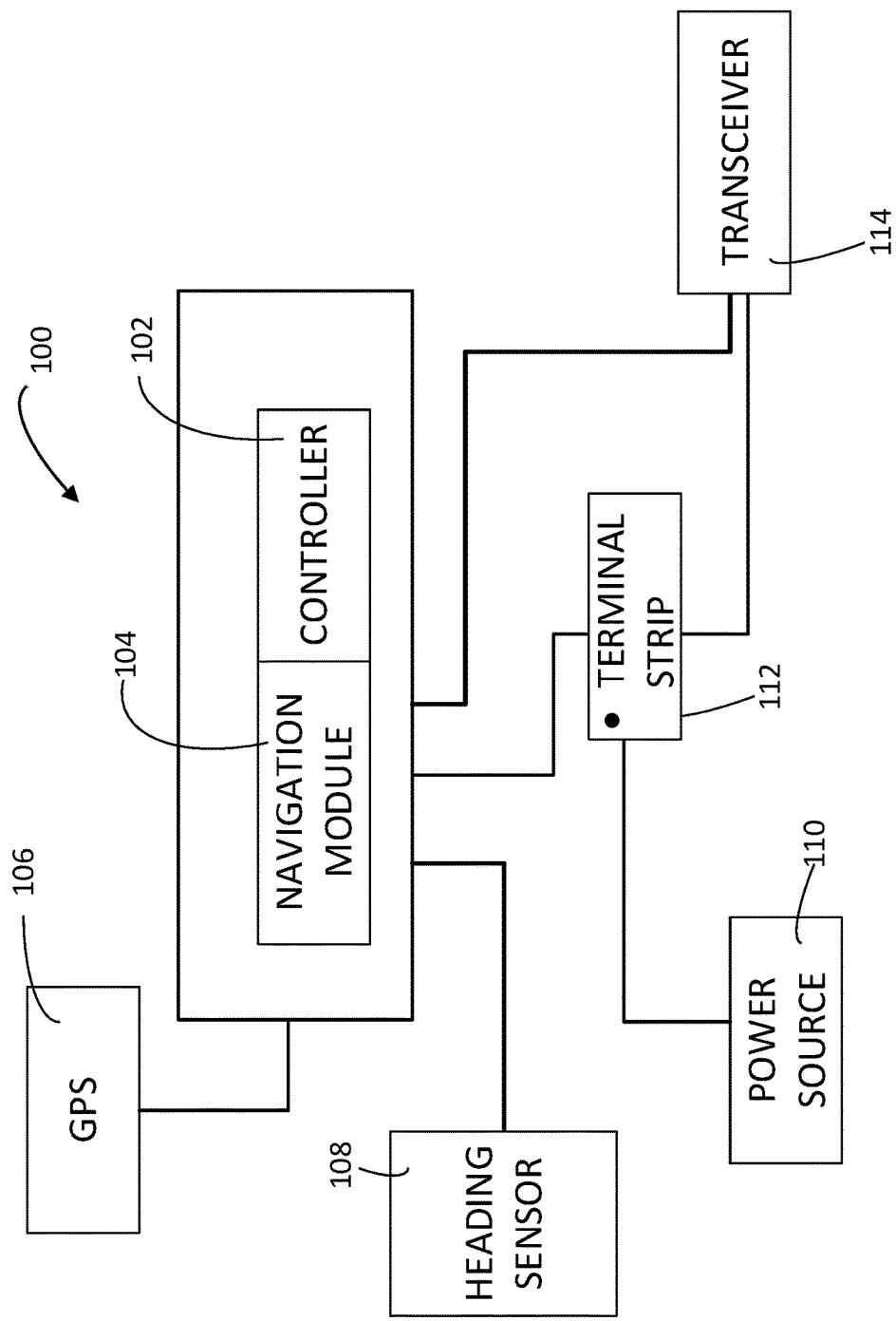
FIG. 1 is a block diagram of an exemplary control system for use with the present invention.

Aspects of the present invention will be explained with reference to exemplary embodiments and examples which are illustrated in the accompanying drawings. These descriptions, embodiments and figures are not to be taken as limiting the scope of the claims. Further, the word "exemplary" is used herein to mean "serving as an example, instance, or illustration." Accordingly, any embodiment described herein as "exemplary" is not to be construed as preferred over other embodiments. Additionally, well-known elements of the embodiments will not be described in detail or will be omitted so as not to obscure relevant details.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Likewise, the term "embodiments" does not require that all embodiments of the invention include any discussed feature or advantage, nor that it does not incorporate aspects of the prior art which are sub-optimal or disadvantageous.

In some instances, the present invention may be described in terms of sequences of actions to be performed by, for example, elements of a computer chip, logic controller or the like. It will be recognized that various actions described herein can be performed by specific circuits by program instructions being executed by one or more processors, or by a combination of both. Such circuits may include any of a variety of circuitry, including one or more controllers such as programmable logic controllers (PLCs), programmable logic relays (PLRs), or any other type of application specific integrated circuits (ASICs). Some other possibilities for implementing aspects of the present invention may include microcontrollers with memory, embedded microprocessors, firmware, software, and hybrids of any of the above device types.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again.

As used herein, the singular forms "a", "an" and "the" are intended to include the plural forms as well, unless the context clearly indicates otherwise. Additionally, the word "may" is used in a permissive sense (i.e., meaning "having the potential to'), rather than the mandatory sense (i.e. meaning "must"). Further, it should also be understood that throughout this disclosure, unless logically required to be otherwise, where a process or method is shown or described, the steps of the method may be performed in any order (i.e. repetitively, iteratively or simultaneously) and selected steps may be omitted. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 2:
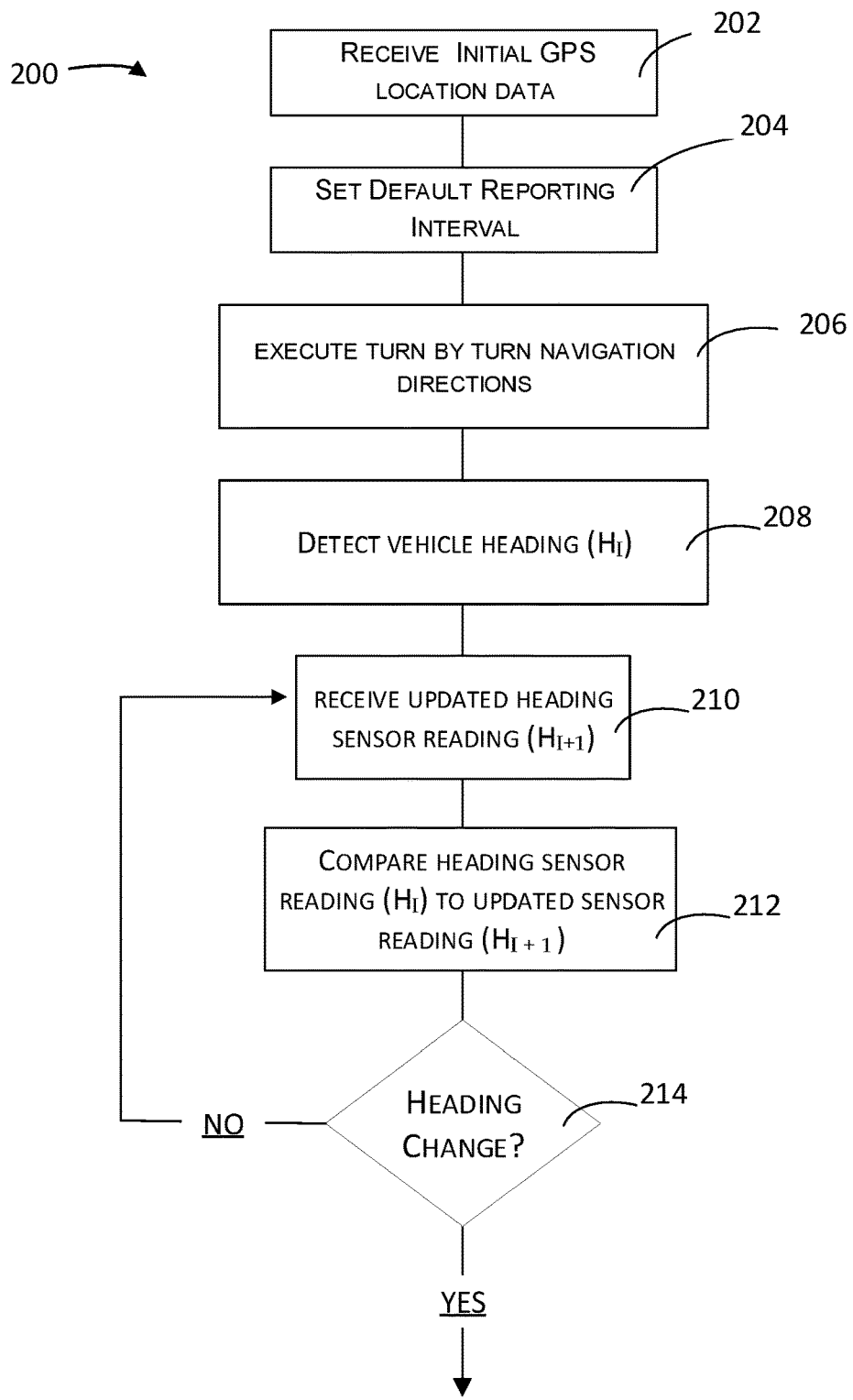
FIG. 2 is a block diagram illustrating a first set of steps for an exemplary method implementing aspects of the present invention.
Figure 3:
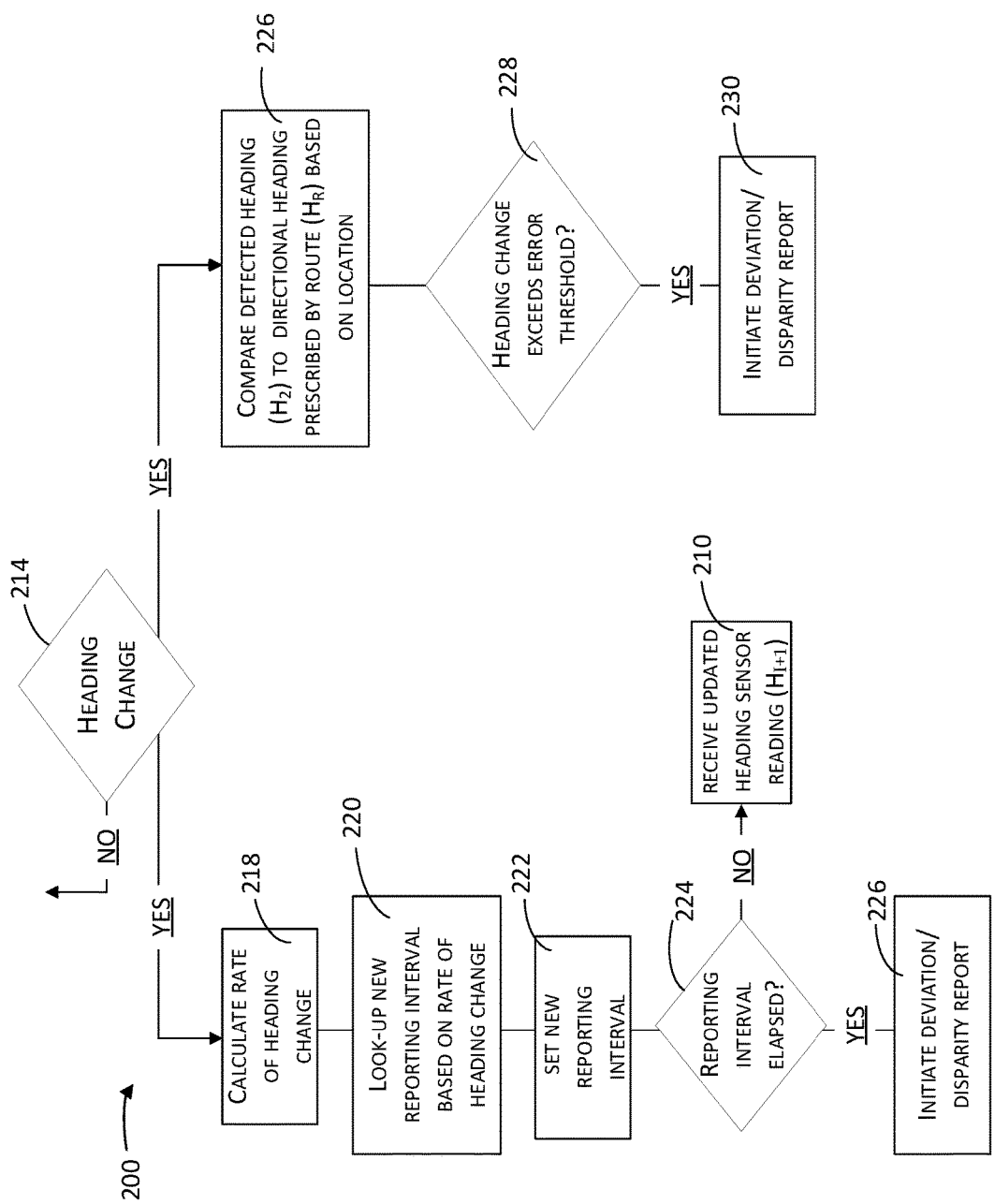
FIG. 3 is a block diagram illustrating further steps of the exemplary method shown in FIG. 2.

With reference now to FIGS. 1-3, the present invention teaches a system, method and apparatus for managing communications and conserving power within a distributed monitoring network. As should be understood, the examples discussed herein are intended to be illustrative and any of a variety of alternative systems, embodiments and/or configurations may be used with the present invention without limitation.

With reference now to FIG. 1, a block diagram of an exemplary system 100 in accordance with aspects of the present invention is provided. According to the present invention, a heading is an angle between 0-360 degrees which provides the physical direction being travelled in comparison to magnetic North (e.g.; a compass or the like). The rate of change of heading is an indication that the telematics device is deviating from a constant course due to a change in travel direction. A trigger for detecting a heading change may preferably be an angle calculation estimated from g-forces detected by a 3-axis accelerometer, gyroscope or the like.

As shown, the exemplary system 100 preferably includes a controller 102 interfaced with a navigation module 104. According to preferred embodiments, the controller 102 may alternatively be a programmable relay or any other type of component preforming the calculations and methods discussed herein. According to a preferred embodiment, the navigation module 104 may preferably be linked to receive signals from a location sensor 106, and at least one heading sensor 108 or the like. The heading sensor 108 may preferably be a directional sensor such as a compass or the like. The heading sensor 108 may be digital or analog, and may be combined with any needed transducers, converters or other components needed to provide a directional sensor reading to the controller 102.

According to alternative preferred embodiments, the location sensor 106 may be a GPS antenna or the like. Alternatively, the location sensor 106 may be based on any of a variety of cellular or satellite location systems such as LORAN, GLONASS, Galileo, BeiDou or the like. Once received, the navigation module 104 preferably communicates the location of the tracked asset to the controller 102 based on received navigational signals.

As shown in FIG. 1, the system 100 may preferably also include a variety of additional systems including a power source 110 (e.g. a battery), and a power distribution system which may preferably include a terminal strip 112 or the like. Additionally, the system preferably may include a transceiver 114 for communicating device status.

With reference now to FIGS. 2 and 3, exemplary steps performed by one or more of the preferred machine components shown in FIG. 1 shall now be discussed. As used in the present application, a heading is understood to be an angle between 0-360 degrees which provides the physical direction being travelled in comparison to magnetic North (i.e. a compass). The system of the present invention may preferably detect changes in the heading of a tracked asset. Additionally, the system of the present invention may preferably analyze the rate of heading changes to determine the frequency and size of heading changes. The present invention may preferably calculate heading changes using any of a variety of sensors and detection mechanisms. Preferably, the size and frequency of heading changes may be calculated from detected g-forces. According to alternative preferred embodiments, such g-forces may be calculated using an accelerometer (e.g. a 3-axis accelerometer), a gyroscope or the like. Alternatively, the changes in the heading may be calculated from detected steering changes in the tracked asset.

According to a first preferred embodiment, the present invention preferably interprets the size and frequency of heading change data to determine the need to transmit data reports and/or to set intervals for future reporting events. According to a further preferred embodiment, the system of the present invention may further change the data included in transmitted reports based on the detected rate and/or degree of change in the heading of a tracked asset.

According to a further preferred embodiment, upon detection of a heading change, the device of the present invention may preferably power a location detection device (e.g. a GPS receiver or the like) to determine an accurate location. At the same time, the asset device may preferably monitor and store both the current heading and the rate of change of the heading. Based on the detected rate of change of the heading, the system may preferably select and update a report frequency based on a lookup table. Preferably, the lookup table may provide selectable temporal sample rates for a range of detected heading changes and/or rate(s) of heading changes. According to a preferred embodiment, the higher the rate of change in the heading may preferably correspond to a higher temporal sample rate. According to alternative preferred embodiments, the system of the present invention may also determine the schedule for powering selected auxiliary devices (e.g. door sensors, cargo sensors, pressure sensors, light sensors, humidity sensors) based on the degree and/or rate of detected heading changes. Additionally, the system of the present invention may also determine how selected inputted data is stored and/or processed based on the same criteria.

For example, the system of the present invention may increase the time between reports when the heading sensor 108 (e.g. accelerometer, gyroscope) detects a low rate of change in the heading of a tracked asset. Additionally, the system may preferably minimize data usage, the amount of data being processed for user interfaces, as well as reporting intervals for any transmitted data based on the rate and/or degree of heading changes.

With reference now to FIGS. 2 and 3, an exemplary preferred method 200 implementing aspects of the present invention shall now be discussed. Beginning with FIG. 2, the system may include a first step 202 of receiving GPS location data. At a second step 204, the system may set default sensor sampling rates and reporting intervals. According to alternative embodiments, the default sampling rates, and reporting intervals may be programmed in the device firmware. Additionally, the default sampling rates, and reporting intervals may be set and selected by system operators either on the device or remotely.

At a next step 206, the system then may preferably proceed to executing a determine navigation route, such as providing and/or tracking turn-by-turn navigation instructions. At step 208, as the system executes navigation functions, the system may preferably detect an initial heading value for the tracked asset. At step 210, the system preferably continually tracks and/or receives updated data indicating the updated heading of the tracked asset. At step 212, the system preferably calculates changes in the heading of the tracked asset on a continual basis. At step 214, if no heading change is detected, the system may proceed to step 210 where the system updates heading sensor readings and proceeds again to determine any changes.

If a heading change is detected in step 214, the system may proceed to analyze the heading change data to trigger potential system parameter changes (e.g. changes in reporting intervals, sensor sample rates, power levels). According to a preferred embodiment, a determination that a heading change has occurred may preferably be based on a set or adjustable threshold. Such threshold(s) may automatically update and adjust depending on a given time of day, location, vehicle type or even a determined cargo type. Preferably, multiple types of heading change algorithms/subroutines/analysis may occur in series or in parallel.

According to a first preferred embodiment, after confirming that a detected heading change has exceeded a set threshold, the system at a next step 218 may preferably proceed to calculating the rate of heading change. According to a preferred embodiment, the rate of heading change may be calculated with as few as two data points. Alternatively, the rate of heading change may be calculated as an average rate of change within a set interval of time which may include multiple heading readings. At a next step 220, the system may then next proceed to adjusting one or more system parameters based on the detected rate of heading changes or a combination of heading rate changes and degree of heading changes. Additionally, the system may adjust one or more system parameters based on the degree/rate of heading change in combination with other factors such as the detected location, time of day, optional routes in a given area or the like.

According to a first preferred embodiment, the system may adjust the reporting interval of the system. Such adjustment may be made with a pre-set adjustment algorithm which may change the reporting frequency based on the rate/degree of change calculated. For example, a default reporting frequency ($RF_D$) may be adjusted using the example algorithm below where $R_A$ represents a reporting adjustment factor.

$$\text{Updated Reporting Frequency} = RF_D * \frac{\Delta \text{ Heading}}{\Delta \text{ Time}} * R_A$$

According to a preferred embodiment, the reporting adjustment factor ($R_A$) may be preset or adjusted by the operator or system based on a range of factors/variables (e.g. time of day, location, vehicle type or even a determined cargo type). For instance, a higher value or more valuable or dangerous cargo may warrant higher reporting rates for detected changes, where lower value cargo may require higher rates of change to trigger an updated reporting frequency. According to alternative preferred embodiments, the same adjustments may be similarly made for other system parameters such as those discussed above.

As discussed above, the system may adjust one or more system parameters based on values precalculated and stored on one or more look-up tables. An exemplary table containing example adjustments to reporting intervals is provided below.

| RATE OF CHANGE IN HEADING (DEGREES/SECOND) | TEMPORAL SAMPLING RATE (SECONDS) |
| --- | --- |
| 0 | 60 |
| 1 | 50 |
| 2 | 40 |
| 3 | 20 |

-continued

| RATE OF CHANGE IN HEADING (DEGREES/SECOND) | TEMPORAL SAMPLING RATE (SECONDS) |
| --- | --- |
| 4 | 5 |
| 5 | 1 |
| 6 | .5 |
| 7 | .1 |
| 8 | .01 |
| 9 | .001 |

Returning to the exemplary method shown in FIG. 3, at a next step 222, the system may proceed to setting a new reporting interval (e.g. an updated reporting frequency). According to alternative preferred embodiments, the system of the present invention may alternatively proceed to select new values for any of the other system parameters such as the parameters listed above. In the case of reporting intervals, at a next step 224, the system may then set a timer and track the elapsed time in the reporting interval. At a next step 210, if the set interval has not elapsed, the system may continue to receive updated sensor readings. Where the reporting interval has lapsed, at next step 226, the system may preferably initiate a system report such as a report providing any deviations or disparities between a programmed routed and the actual route travelled by the tracked asset. Alternatively, such reports may include selected deviations/disparities between any sensor reading and pre-set thresholds for the sensors.

In parallel with the updating of reporting intervals (steps 218-226), where a heading change is detected in step 214, the system may compare the detected heading ($H_2$) to a directional heading prescribed by a given route ($H_R$) based on the detected location. At a next step 228, the system may preferably determine whether the detected heading change exceeds a pre-set threshold. If YES, the system may then initiate a report detailing any deviations or disparities between the detected heading and the expected heading based on the route being executed. Alternatively, such reports may include selected deviations/disparities between any sensor reading and corresponding pre-set thresholds.

The present invention has been disclosed above with reference to several examples. These examples are not intended to be limiting. Instead, the scope of the present invention should be determined purely by the terms of the appended claims and their legal equivalents.

What is claimed is:

1. A method for reporting data from a telematics device which is associated with a tracked asset, the method comprising:
receiving GPS location data;
determining a first sampling rate and a first reporting rate; wherein the step of determining a first sampling rate and a first reporting rate comprises setting a preset default sampling rate and a preset default reporting interval;
executing a determined navigation route;
detecting a first heading value of the tracked asset;
receiving updated heading data for the tracked asset;
wherein the update heading data comprises a second heading value;
comparing the first heading value and the second heading value;
calculating a degree of heading change for the tracked asset;
calculating a rate of heading change for the tracked asset;
adjusting a system parameter when the degree of heading change between the first heading value and the second heading value exceeds a stored degree of heading change threshold; and
adjusting a system parameter change when the rate of heading change exceeds a stored rate of heading change threshold;
wherein the system parameter change comprises a change in a system parameter selected from the group of system parameters comprising: reporting intervals, sensor sample rates, and power levels.

2. The method of claim 1, wherein the system parameter change comprises an adjustment to a reporting interval based on a stored adjustment algorithm.

3. The method of claim 2, wherein the stored adjustment algorithm changes the reporting frequency based at least in part on the degree of heading change and the rate of heading change.

4. The method of claim 3, wherein the pre-set adjustment algorithm calculates an updated reporting frequency.

5. The method of claim 4, wherein an updated report frequency is calculated by adjusting a default reporting frequency ($RF_D$) based on the rate of heading change and a reporting adjustment factor ($R_A$).

6. The method of claim 5, wherein the adjustment algorithm comprises:

$$\text{Updated Reporting Frequency} = RF_D * \frac{\Delta \text{ Heading}}{\Delta \text{ Time}} * R_A.$$

7. The method of claim 5, wherein the reporting adjustment factor is adjusted based on at least one factor selected from the group of factors comprising: time of day, location, vehicle type and cargo type.

8. The method of claim 7, wherein the report adjustment factor is adjusted to be higher based on a determined cargo value.

9. The method of claim 7, wherein the report adjustment factor is adjusted to be higher based on a determined degree of hazard associated with a determined cargo.

10. The method of claim 9, wherein a higher report adjustment factor causes higher reporting rates; wherein a lower report adjustment factor causes lower reporting rates.

11. The method of claim 10, wherein the heading change threshold is adjusted based on a detected time of day, location, vehicle type or determined cargo type.

12. The method of claim 11, wherein the rate of heading change is calculated as an average rate of change in the heading within a set interval of time.

13. The method of claim 5, wherein the method further comprises: adjusting one or more system parameters based at least in part on the calculated rate of heading change and the calculated degree of heading change.

14. The method of claim 13, wherein the method further comprises: adjusting one or more system parameters based on the calculated rate of heading change and the calculated degree of heading change in combination with at least one factor selected from the group of factors comprising: the detected location, time of day, and optional routes.

15. A system for monitoring and detecting heading changes for a telematics device, the system comprising:
a positioning module, wherein the positioning module comprises a first location sensor;
a navigation module; wherein the navigation module is configured to receive a location input from the positioning module indicating the location of the telematics device; wherein the navigation module is configured to track and display the location of the telematics device relative to a tracked route;

a heading sensor, wherein the heading sensor is configured to determine a direction of travel of the telematics device;

an accelerometer; wherein the accelerometer is configured to detect g-forces experienced by the telematics device; wherein the accelerometer is configured to output accelerometer data to the controller; wherein the controller is configured to determine a heading change event based on accelerometer data; and a controller; wherein the controller is interfaced with the navigation module; wherein the controller is configured to execute the method of claim 1.

* * * * *